(12) United States Patent
Nakajima

(10) Patent No.: US 9,720,203 B2
(45) Date of Patent: Aug. 1, 2017

(54) LENS UNIT

(71) Applicant: NIDEC SANKYO CORPORATION, Suwa-gun, Nagano (JP)

(72) Inventor: Tomoaki Nakajima, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/824,511

(22) Filed: Aug. 12, 2015

(65) Prior Publication Data

US 2016/0091690 A1 Mar. 31, 2016

(30) Foreign Application Priority Data

Sep. 26, 2014 (JP) ................. 2014-196319

(51) Int. Cl.
*G02B 7/02* (2006.01)
*G02B 1/04* (2006.01)

(52) U.S. Cl.
CPC .............. *G02B 7/026* (2013.01); *G02B 1/041* (2013.01); *G02B 7/021* (2013.01); *G02B 7/028* (2013.01)

(58) Field of Classification Search
CPC ........ G02B 7/026; G02B 7/028; G02B 7/003; G02B 7/008; G02B 7/021; G02B 1/041
USPC ................. 359/754, 819, 820, 830
See application file for complete search history.

(56) References Cited

U.S. PATENT DOCUMENTS

| 2009/0244733 A1* | 10/2009 | Sasaki | ............... G02B 7/026 359/830 |
| 2009/0245766 A1* | 10/2009 | Sasaki | ............... G02B 7/021 396/25 |
| 2010/0027135 A1* | 2/2010 | Sodeyama | ............ G02B 7/021 359/740 |

FOREIGN PATENT DOCUMENTS

JP         2011059396 A         3/2011

\* cited by examiner

*Primary Examiner* — Jordan Schwartz
(74) *Attorney, Agent, or Firm* — Cantor Colburn LLP

(57) ABSTRACT

A lens unit may include a plurality of lenses, a lens holder, and a circular ring-shaped sealing member made of rubber. A first lens disposed closest to an object side is a plastic lens and formed with a small diameter part in a step shape on an image side of the first lens. A sealing member accommodation part is provided between an outer peripheral face of the small diameter part and an opposed face and accommodates the sealing member so as to have clearance in an optical axis direction. An inner face of the lens holder is formed with a sealing member coming-off prevention part which is projected to the sealing member accommodation part to narrow the clearance on the image side of the sealing member accommodation part and thereby movement to the image side of the sealing member is restricted.

14 Claims, 7 Drawing Sheets

PRIOR ART

LENS UNIT

CROSS REFERENCE TO RELATED APPLICATION

The present invention claims priority under 35 U.S.C. §119 to Japanese Application No. 2014-196319 filed Sep. 26, 2014, the entire content of which is incorporated herein by reference.

FIELD OF THE INVENTION

At least an embodiment of the present invention may relate to a lens unit. More specifically, at least an embodiment of the present invention may relate to a lens unit provided with a coming-off prevention structure of a sealing member.

BACKGROUND

A lens unit provided with a coming-off prevention structure of an O-ring has been disclosed in Japanese Patent Laid-Open No. 2011-059396. In the lens unit disclosed in the Patent Literature, an O-ring is attached to a small diameter part 11a of a lens 11 disposed on the most object side of a plurality of lenses and the O-ring is prevented from displacing to the image side by forming an outer peripheral face of the small diameter part 11a in an inclined face which is enlarged to an outer side in a radial direction toward the image side.

An on-vehicle periphery monitoring camera which is arranged on an outer side of a vehicle and is structured to capture images of the condition surrounding its vehicle is used under harsh environmental conditions such as wind, rain and dust. Therefore, respective units including the lens unit which constitute a monitoring camera are required to provide with a measure for preventing foreign matters from entering into an inside of the mechanism.

In order to provide a lens unit with waterproof performance by using an O-ring, in a case that the most object side lens (hereinafter, referred to also as "first lens") is a glass lens, the lens unit may be structured as shown in FIG. 7A. In other words, an O-ring 4' is attached to a lens holder in a state that upper and lower faces of the O-ring 4' are compressed by the first lens 21' in an axial direction.

In such a lens unit, generally, after respective lenses and an O-ring 4' are disposed within a lens holder, a caulking part provided at an object side edge part of the lens holder is thermally caulked and thereby they are fixed in the inside of the lens holder. In this case, the object side edge part of the lens holder is required to thermally caulk while pressing the first lens 21' against the lens holder with a jig so that the first lens 21' is not lifted to the object side by a repulsive force of the O-ring 4' which is compressed in the axial direction.

Since heat is transmitted to the jig when thermal caulking is performed, temperature of the jig may rise close to about 200 degrees (200° C.). The first lens 21' is pressed by the jig at a high temperature and thus, in this method, it is a prerequisite that the first lens 21' is a glass lens. When the first lens 21' is a plastic lens, a portion of the plastic lens with which the jig is abutted will be melted and thus, this method cannot be used.

As a structure for attaching an O-ring 4' to a lens unit whose first lens 21' is a plastic lens, a structure is conceivable in which the first lens 21' is not pressed by a jig as shown in FIG. 7B. In the lens unit shown in FIG. 7B, faces of the O-ring 4' in the inside and outside diameters are compressed in a radial direction by the first lens 21' and thus the first lens 21' is not pressed to the object side by a repulsive force of the O-ring 4'. A plastic lens has larger flexibility in shape than a glass lens and thus the structure shown in FIG. 7B is commonly adopted.

An O-ring 4' is assembled into the lens unit shown in FIG. 7B as follows. First, an O-ring 4' is attached to a first lens 21' and, after that, the first lens 21' to which the O-ring 4' is attached is fitted into the lens holder and a caulking part of the lens holder is thermally caulked. In this assembling method, an attaching position of the O-ring 4' may be sometimes displaced when the first lens 21' is press-fitted into the lens holder or due to unintended contacting of the O-ring 4' with the lens holder or the like. Specifically, when the first lens 21' to which the O-ring 4' is attached is to be fitted into the lens holder, for example, in FIG. 7B, if a part on the left end side of the O-ring 4' in the drawing is caught by a flat face of the lens holder and the O-ring 4' is not smoothly inserted into the lens holder, a right end side of the O-ring 4' may be pulled to an inner side in the radial direction and to a left lower side and may be bitten between a flat face on the lower side of the lens holder and an under face of the first lens 21'. Alternatively, when a distance between the under face of the first lens 21' and a flat face on the lower side of the lens holder is large, the O-ring 4' is easily come off. In other words, when a position of the O-ring 4' is displaced, the O-ring 4' may be come off or the O-ring 4' may be bitten and caught between the first lens 21' and the lens holder.

Further, the lens unit shown in FIG. 7B is structured so that the faces of the O-ring 4' in the inside and outside diameters are compressed in the radial direction by the first lens 21' and thus clearance in a groove where the O-ring 4' is disposed is provided in an axial direction. From a viewpoint of assembling, a structure that a cylindrical surface is sealed by the faces in the inside and outside diameters of the O-ring may easily occur displacement of an attaching position of the O-ring in comparison with a case that sealing is performed by upper and lower faces of the O-ring. Therefore, even after lenses and an O-ring are assembled into a lens holder, an attaching position of the O-ring in the groove may be displaced through usage on an outer side of a vehicle under harsh environmental conditions. As a result, distortion, twisting, slacking or the like may occur in the O-ring and thus waterproof performance may be lowered.

SUMMARY

In view of the problem described above, at least an embodiment of the present invention may advantageously provide a lens unit whose lens on the most object side is a plastic lens in which, when a circular ring-shaped sealing member made of rubber is attached to the plastic lens and to be assembled to a lens holder, coming-off or biting of the sealing member can be prevented and, in addition, lowering of waterproof performance due to occurrence of distortion, twisting, slacking or the like of the sealing member can be also prevented after assembling has finished.

According to at least an embodiment of the present invention, there may be provided a lens unit including a plurality of lenses, a lens holder which holds the plurality of the lenses, and a circular ring-shaped sealing member made of rubber. A first lens of the lenses which is disposed on the most object side is a plastic lens and is formed with a small diameter part whose outer diameter is set to be smaller in a step shape on an image side of the first lens. A sealing member accommodation part which is a space in which the sealing member is disposed is provided between an outer peripheral face of the small diameter part and an opposed face which is an inner peripheral face of the lens holder that faces the outer peripheral face of the small diameter part. The sealing member accommodation part accommodates the sealing member so as to have clearance in an optical axis direction, and an inner face of the lens holder for defining the sealing member accommodation part is formed with a sealing member coming-off prevention part which is projected to the sealing member accommodation part to narrow the clearance on the image side of the sealing member accommodation part and thereby movement to the image side of the sealing member is restricted.

Even in a case that an attaching position of a circular ring-shaped sealing member made of rubber is displaced when a first lens to which the sealing member is attached is to be fitted to a lens holder, a sealing member coming-off prevention part is projected on an image side of the sealing member accommodation part which is a side where the sealing member may be come off. Therefore, even when the sealing member is displaced, the sealing member is abutted with the sealing member coming-off prevention part and thus the coming-off of the sealing member is prevented. Further, as a result, distortion of the sealing member is reduced when the first lens is fitted into the lens holder and thus the sealing member is hard to be bitten between the first lens and the lens holder. In a case that a sealing member is compressed in a radial direction and sealing is performed with its inside and outside diameter faces, clearance of the sealing member accommodation part is provided in an optical axis direction with respect to the sealing member. In this case, the clearance on the image side in the sealing member accommodation part is narrowed by the sealing member coming-off prevention part and thus a range in which the sealing member can be displaced to an image side direction is restricted. As a result, distortion, twisting, slacking and the like are hard to be occurred even when used on an outer side of a vehicle under harsh environmental conditions.

It is preferable that the sealing member is an O-ring.

Since O-rings with various standards and dimensions are commonly and widely used and thus an O-ring which is most suitable for the lens unit of at least an embodiment of the present invention is inexpensively and stably obtained. Further, high sealing performance when an O-ring is appropriately attached has been demonstratively confirmed and thus reliability as a sealing member is high.

In at least an embodiment of the present invention, an end face on the image side of the sealing member accommodation part is formed of an image side end face which is extended to an inner side in a radial direction from an end on the image side of the opposed face, and the sealing member coming-off prevention part is a protruded part which is formed so that a part of the image side end face is protruded to an inside of the sealing member accommodation part. In this case, it may be structured that the protruded part is, when viewed as a cross section in the optical axis direction, a step part which is formed of a flat face which is extended in the radial direction toward an outer peripheral face of the small diameter part of the first lens and an inner side face which is extended from the image side end face in the optical axis direction, the flat face is provided with a radial direction width which is equal to or wider than a half of a radial direction distance between the outer peripheral face of the small diameter part and the opposed face of the lens holder, and the inner side face extended in the optical axis direction of the step part is formed to a position facing the outer peripheral face of the small diameter part in the radial direction. Further, it is preferable that a length in the optical axis direction of the sealing member accommodation part is set to be smaller than a length in the optical axis direction of the small diameter part of the first lens by the flat face of the step part. According to this structure, displacement of the sealing member in the sealing member accommodation part can be reduced.

In at least an embodiment of the present invention, the protruded part is formed over the entire periphery of the sealing member accommodation part.

In a case that a protruded part is formed at only a part of the sealing member accommodation part, the sealing member may come off in a portion having no protruded part to cause distortion, twisting, slacking and the like and its sealing performance may be lowered. However, when the protruded part is formed over the entire periphery of the sealing member accommodation part, the problem is eliminated.

Further, in at least an embodiment of the present invention, the outer peripheral face of the small diameter part is formed in an inclined face whose outer diameter becomes smaller toward the image side.

In this case, it is preferable that an inclination angle ($\theta$) with respect to the optical axis direction of the inclined face is set as follows.

$$1° \leq \theta \leq 3°$$

When the outer peripheral face of the small diameter part is formed in an inclined face whose outer diameter becomes smaller toward the image side, assembling of the first lens to the lens holder becomes easy. Further, since a force directing to the image side is intentionally generated to the sealing member, the sealing member is hard to be caught and bitten between the first lens and the lens holder. Also in this case, coming-off of the sealing member is prevented by the sealing member coming-off prevention part and thus both of easiness of assembling and stability of waterproof performance are attained. Further, releasability (separation from the die) of the lens holder from a die is also superior.

Further, in at least an embodiment of the present invention, the sealing member coming-off prevention part is an inclined face which is formed so that the opposed face is projected to an inner side in a radial direction toward the image side.

Further, in at least an embodiment of the present invention, an inner diameter of the opposed face is smaller than an outer diameter of a large diameter part of the first lens which is a portion to the object side of the small diameter part, an end face on the object side of the sealing member accommodation part is a step face which is formed by connecting an outer peripheral face of the large diameter part of the first lens with the outer peripheral face of the small diameter part, the step face being extended in a radial direction, and an object side end part of the opposed face facing the step face is formed in a chamfered shape or a rounded shape.

In the lens unit in at least an embodiment of the present invention, a portion where the sealing member is most easily caught and bitten is an opposed part between an object side edge part of the opposed face and the step face. Therefore, when the edge part on the object side end part of the opposed face is removed in a chamfered shape or a rounded shape and a gap space is provided in the opposed portion, biting of the sealing member can be prevented effectively. In this case, it is preferable that the lens holder is formed with a large diameter flat face which faces the step face of the first lens and is connected with the opposed face, a chamfered face which is formed in a chamfered shape or a rounded shape is formed between an inner side edge part of the large diameter flat face and an object side edge part of the opposed face, and an outermost position of the chamfered face connected with the large diameter flat face is located at a position on an outer side with respect to an outer peripheral face of the sealing member in a state that the sealing member is attached to the small diameter part of the first lens but the sealing member is not compressed by the opposed face. According to this structure, biting of the sealing member can be further surely prevented.

Further, in at least an embodiment of the present invention, the step face is formed with a pushing part which is protruded in an inside of the sealing member accommodation part.

When the first lens is to be fitted into the lens holder, the pushing part first pushes the sealing member to an inside of the sealing member accommodation part before an object side edge part of the opposed face and the step face are brought close to each other and thus the sealing member is prevented from being bitten between the object side end part of the opposed face and the step face.

Further, in at least an embodiment of the present invention, occupation rate of the sealing member in the sealing member accommodation part is 85%-90%.

Since the occupation rate is set in a higher level and clearance in the sealing member accommodation part is suppressed to a requisite minimum, displacement of the sealing member in the sealing member accommodation part can be further reduced.

According to the lens unit in at least an embodiment of the present invention, in the lens unit whose most object side lens is a plastic lens, when the plastic lens attached with a circular ring-shaped sealing member made of rubber is to be fitted to the lens holder, coming-off and biting of the sealing member can be prevented. Further, waterproof performance of the lens unit is prevented from being lowered due to distortion, twisting, slacking and the like after assembling is performed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A lens unit in accordance with at least an embodiment of the present invention will be described in detail below with reference to the accompanying drawings. A lens unit 1 in this embodiment is a lens assembly which is provided with a wide angle lens and is incorporated in an on-vehicle periphery monitoring camera. In the present invention, an "object side" and an "image side" mean an object side and an image side in an optical axis "L" direction shown in FIG. 1. An "axial direction" is a direction parallel to the optical axis "L" and a "radial direction" is a direction perpendicular to the optical axis "L".

(Entire Structure)

Figure 1:
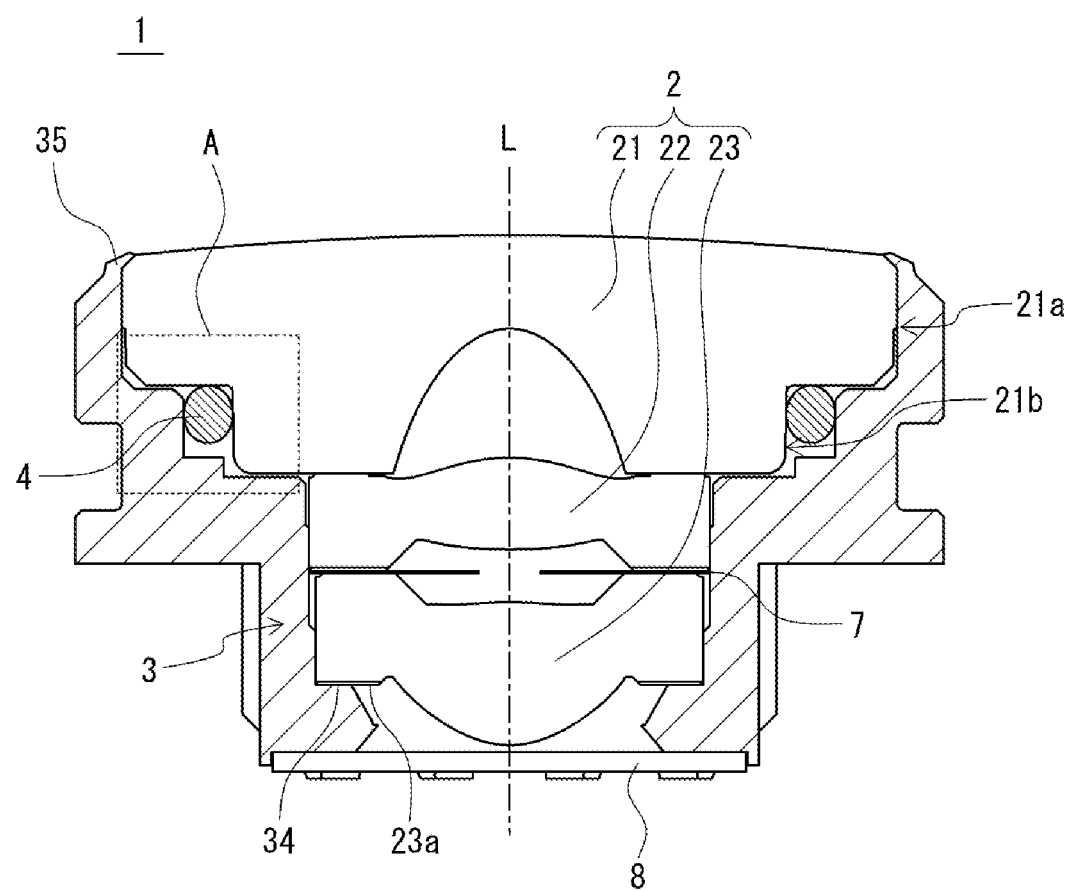
FIG. 1 is an explanatory view showing an entire structure of a lens unit 1.

A lens unit 1 is, as shown in FIG. 1, structured of a wide angle lens 2 constituted of three lenses, i.e., a first lens 21, a second lens 22 and a third lens 23 which are disposed along an optical axis "L", a diaphragm 7, an optical filter 8, an O-ring 4 made of rubber which is a circular ring-shaped sealing member, and a lens holder 3 which holds them.

In the lenses constituting the wide angle lens 2, the first lens 21 which is a lens disposed on the most object side is a concave lens constituted of a large diameter part 21a which is a portion on the object side of the lens and a small diameter part 21b which is a portion on its image side whose outer diameter is set to be smaller than the large diameter part 21a in a step shape. The second lens 22 located to the image side of the first lens 21 is a convex lens whose diameter is further smaller than the small diameter part 21b of the first lens 21. The third lens 23 located to the image side of the second lens 22 is a convex lens whose diameter is slightly smaller than the second lens 22. The diaphragm 7 is disposed between the second lens 22 and the third lens 23. The first lens 21, the second lens 22, the third lens 23 and the diaphragm 7 are disposed so as to be contacted with each other in the axial direction. The respective lenses are plastic lenses from a viewpoint of excellent workability of a lens and its economic efficiency.

The wide angle lens 2 is an inverted telescopic type (so-called retro-focus type) single focus wide angle lens which is constituted of three groups having three pieces, i.e., the first lens 21 having a negative power, the second lens 22 and the third lens 23 having positive powers and has an angle of field (viewing angle) of 135°. The wide angle lens 2 of the lens unit 1 in this embodiment is constituted of three lenses. However, the wide angle lens 2 may be constituted of four or more lenses and may include a cemented lens.

The lens holder 3 is a lens frame structuring a lens barrel which is formed in a cylindrical shape and made of resin. The lens holder 3 is provided with an inner peripheral face whose diameter is reduced stepwise toward the image side along the outer peripheral faces of the respective lenses constituting the wide angle lens 2. The outer peripheral faces of the respective lenses constituting the wide angle lens 2 are supported by the inner peripheral face of the lens holder 3 and thereby the respective lenses are positioned in a radial direction. Further, a ring-shaped flat face part 23a formed at a periphery on the image side face of the third lens 23 is placed on a horizontal face 34 extended to an inner side in the radial direction at an image side end part of the lens holder 3, and a periphery on the object side face of the first lens 21 is engaged with a caulking part 35 provided at an object side edge part of the lens holder 3 and, as a result, the respective lenses constituting the wide angle lens 2 are positioned in the axial direction.

(Sealing Structure)

Figure 2:
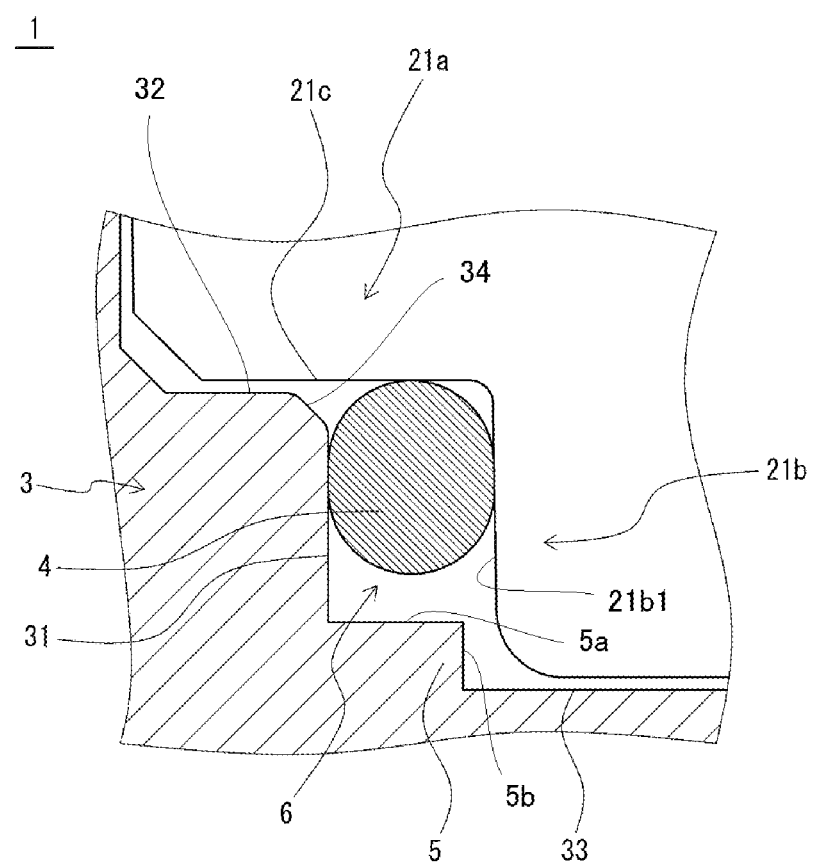
FIG. 2 is a partly enlarged view showing a portion of the lens unit 1 which is surrounded by the dotted line "A".

As shown in FIG. 2, a sealing member accommodation part 6 which is a space to which an O-ring 4 is fitted is provided between an outer peripheral face 21b1 of the small diameter part 21b of the first lens 21 and an opposed face 31 which is an inner peripheral face of the lens holder 3 that faces the outer peripheral face 21b1 of the small diameter part 21b. The O-ring 4 disposed in the sealing member accommodation part 6 is compressed in the radial direction by the outer peripheral face 21b1 of the small diameter part 21b and the opposed face 31 and thereby the gap between the first lens 21 and the lens holder 3 is sealed by the inside and outside faces of the O-ring 4. A clearance for absorbing expansion in the axial direction of the O-ring 4 due to compression or the like is provided on the image side with respect to the O-ring 4 in the sealing member accommodation part 6.

An O-ring 4 is used as a sealing member in this embodiment. However, this is because that an O-ring is superior in easiness in acquisition and economic efficiency and thus, instead of using an O-ring 4, a square ring, a so-called "D"-ring, "X"-ring and the like may be used.

An end face on the image side of the sealing member accommodation part 6 is structured to be a horizontal face 33 which is an image side end face extending to an inner side in the radial direction from an end on the image side of the opposed face 31 of the lens holder 3. An end part on the opposed face 31 side of the horizontal face 33 is formed with a protruded part 5 which is a sealing member coming-off prevention part so as to be protruded stepwise to an inside of the sealing member accommodation part 6. The protruded part 5 is, when viewed as a cross section in the optical axis direction (see FIG. 2), formed as a step part formed of a flat face 5a extended in a radial direction and an inner side face 5b extending in the optical axis direction. The flat face 5a and the inner side face 5b are provided so as to surround the entire periphery of the small diameter part 21b. The flat face 5a is provided with a radial direction width which is equal to or wider than a half of a radial direction distance (gap width) between the outer peripheral face 21b1 of the small diameter part 21b and the opposed face 31 of the lens holder 3. A height of the inner side face 5b (width in the optical axis direction) from the horizontal face 33 reaches to a vicinity of an upper end of an "R"-part which is formed between a bottom face of the small diameter part 21b and the outer peripheral face 21b1. Therefore, even when the O-ring 4 is applied with a force for moving it to the bottom face side of the small diameter part 21b, its movement to the bottom face side is prevented. The protruded part 5 is integrally formed as a part of the horizontal face 33 which is the image side end face. Further, the protruded part 5 in this embodiment is formed so that an end part on its outer side in the radial direction is integrated with the opposed face 31 from a viewpoint of easiness of molding. However, the protruded part 5 is not required to be integrated with the opposed face 31 and a gap may be provided between the opposed face 31 and the protruded part 5. Further, in this embodiment, the flat face 5a is formed to be a horizontal face which is perpendicular to the optical axis direction but may be formed to be an inclined face which is inclined with respect to the horizontal direction. In a case that the protruded part 5 is provided over the entire periphery of the sealing member accommodation part 6, when the flat face 5a is formed to be the horizontal face which is perpendicular to the optical axis direction, the flat face 5a forms a circular ring-shaped horizontal face. Alternatively, when the flat face 5a is formed to be the inclined face which is inclined with respect to the horizontal direction, the flat face 5a forms a circular truncated cone-shaped face.

Figure 3:
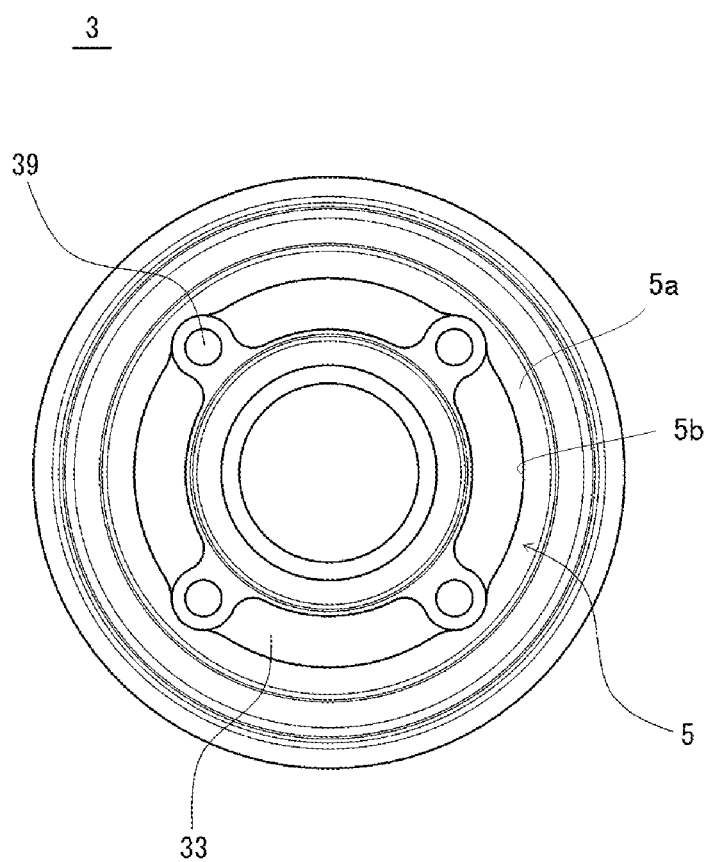
FIG. 3 is a plan view showing a lens holder 3.

As shown in FIG. 3, the horizontal face 33 is formed with recessed parts 39 in a slightly concave shape at positions where pushing pins are protruded and abutted with the lens holder 3 when the lens holder 3 is to be separated from a die so that height of a burr formed by pushing of the pushing pin is canceled. The protruded part 5 is formed in a ring shape over the entire periphery of the sealing member accommodation part 6 while avoiding the recessed parts 39. As a result, an O-ring 4 is prevented from being come off at a portion where no protruded part 5 is provided and distortion, twisting, slacking or the like are prevented from being occurred and thus a sufficient sealing performance can be attained.

When an O-ring 4 is to be assembled into the lens unit 1 in this embodiment, first, an O-ring 4 is attached to the small diameter part 21b of the first lens 21 and, after that, the first lens 21 to which the O-ring 4 has been attached is fitted to an inside of the lens holder 3. A step face 21c is provided between the large diameter part 21a and the small diameter part 21b of the first lens 21. The step face 21c is formed by connecting the outer peripheral face of the large diameter part 21a with the outer peripheral face 21b1 of the small diameter part 21b in the radial direction so as to form a ring-shaped flat face extending in a circumferential direction. On the other hand, a large diameter flat face 32 of the lens holder 3 connected with the opposed face 31 is provided so as to face the step face 21c. For example, in a case that the first lens 21 to which an O-ring 4 has been attached is to be fitted to the lens holder 3, even when a portion on the right end side of the O-ring 4 is caught between the step face 21c of the first lens 21 and the large diameter flat face 32 of the lens holder 3 and, as a result, a portion on the left end side of the O-ring 4 is pulled to the right side in FIG. 2, movement of the portion on the left end side of the O-ring 4 is prevented by the protruded part 5. In other words, even in a case that an attaching position of the O-ring 4 is displaced when the first lens 21 is to be fitted to the lens holder 3, the protruded part 5 is projected on the image side of the sealing member accommodation part 6 which is a side where the O-ring 4 is easy to come off. Therefore, the O-ring 4 is abutted with the protruded part 5 and thus the coming-off of the O-ring 4 is prevented. Further, as a result, distortion of the O-ring 4 is reduced when the first lens 21 is fitted into the lens holder 3 and the O-ring 4 is hard to be bitten between the bottom face of the small diameter part 21b of the first lens 21 and the horizontal face 33 of the lens holder 3. Therefore, the problem that the O-ring 4 is caught and bitten in a space between the first lens 21 and the lens holder 3 is eliminated. On the other hand, in this case, since a portion on the left end side of the O-ring 4 is abutted with the protruded part 5 and its movement is prevented and thus, on the contrary, a portion on the right end side of the O-ring 4 receives a force toward the inner side and thus the portion on the right end side of the O-ring 4 is released from being caught.

In addition, the lens unit 1 in this embodiment is structured so that the O-ring 4 is attached to the small diameter part 21b of the first lens 21 which is a cylindrical surface and a gap is sealed by the faces of the O-ring 4 in the inside and outside diameters. Therefore, from a viewpoint of assembling, in comparison with a case that sealing is performed by the upper and lower faces of the O-ring 4, an attaching position of the O-ring 4 may be easily displaced. However, a clearance on the image side of the sealing member accommodation part 6 is narrowed by the protruded part 5 and a displaceable range of the O-ring 4 is restricted in the sealing member accommodation part 6. Therefore, distortion, twisting, slacking and the like due to displacement of the O-ring 4 are hard to be occurred even when used on an outer side of a vehicle under harsh environmental conditions.

An inner diameter of the opposed face 31 is smaller than an outer diameter of the large diameter part 21a of the first lens 21. Further, an end face on the object side of the sealing member accommodation part 6 is structured of the step face 21c which is a ring-shaped flat face extending in a circumferential direction formed by connecting an outer peripheral face of the large diameter part 21a with an outer peripheral face of the small diameter part 21b in a radial direction and an object side edge part of the opposed face 31 which faces the step face 21c is formed in a chamfered shape. In other words, a chamfered face 34 is formed between an inner side edge part of the large diameter flat face 32 of the lens holder 3 and the object side edge part of the opposed face 31.

In the lens unit 1, a portion where the O-ring 4 is most easily caught and bitten is an opposed part between the object side edge part of the opposed face 31 (inner side edge part of the large diameter flat face 32) and the step face 21c. However, an edge part of an object side end part of the opposed face 31 is chamfered to form a chamfered face 34 and a large gap is provided at the opposed part and thus biting of the O-ring 4 is prevented effectively. In this embodiment, the chamfered face 34 is formed largely so that the O-ring 4 is hard to be caught. Specifically, an upper end position of the chamfered face 34 which is connected with the large diameter flat face 32, in other words, an outermost position of the chamfered face 34 is located at an outer side position with respect to an outer peripheral face of the O-ring 4 in a state that the O-ring 4 is attached to the small diameter part 21b of the first lens 21 but the O-ring 4 is not compressed by the opposed face 31 (before the O-ring 4 is compressed by the opposed face 31). Therefore, when an O-ring 4 is attached to the small diameter part 21b of the first lens 21 and the first lens 21 to which the O-ring 4 has been attached is to be fitted to an inside of the lens holder 3, the O-ring 4 is abutted with the chamfered face 34 and thus the O-ring 4 is prevented from being caught between the step face 21c of the first lens 21 and the large diameter flat face 32 of the lens holder 3.

In this embodiment, a chamfered face having 45° with respect to the opposed face 31 is formed on an edge part of an object side end part of the opposed face 31. However, an angle of a chamfered face of the edge part is not limited to 45° and is freely adjustable in a range where the effect can be attained that the O-ring 4 is hard to be caught and bitten. In addition, a method for removing an edge part is not limited to chamfering and an edge part may be rounded in an "R"-shape. Also in a case that the edge part is formed in an "R"-face, it is preferable that the size of the "R"-face is set so that an outer peripheral face of the O-ring 4 is abutted with the "R"-face when the small diameter part 21b of the first lens 21 to which the O-ring 4 has been attached is to be fitted to the inside of the lens holder 3.

Cross sectional lengths in the axial direction and the radial direction of the protruded part 5 are adjusted so that occupation rate of the O-ring 4 in the sealing member accommodation part 6 is set to be 85%-90%, which is slightly higher than a general recommended value and a displaceable range of the O-ring 4 in the sealing member accommodation part 6 is minimized.

Other Embodiments

Figure 4:
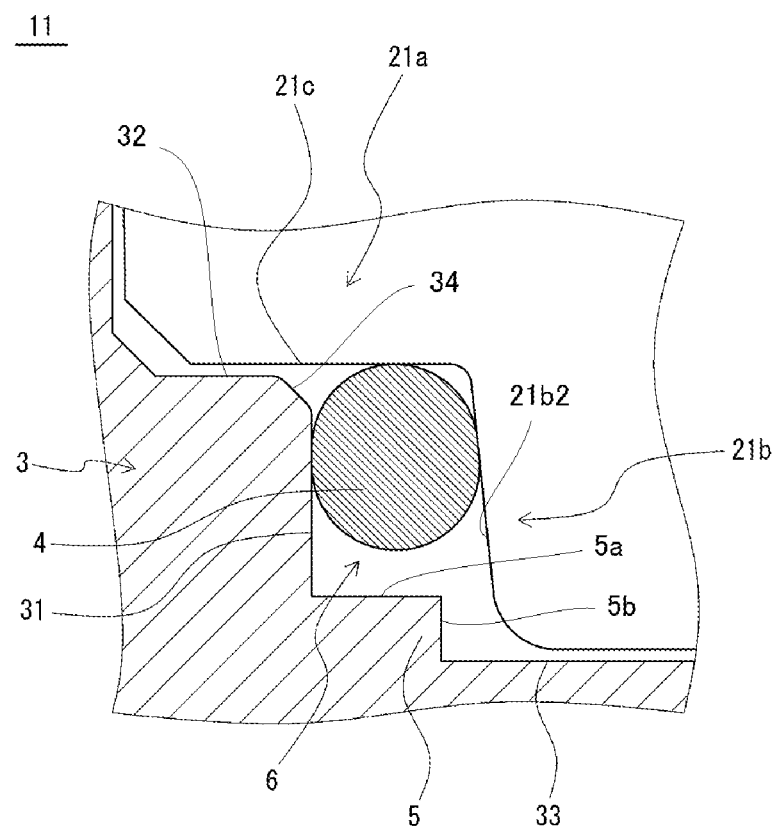
FIG. 4 is a partly enlarged view showing a sealing structure of a lens unit 11.
Figure 5:
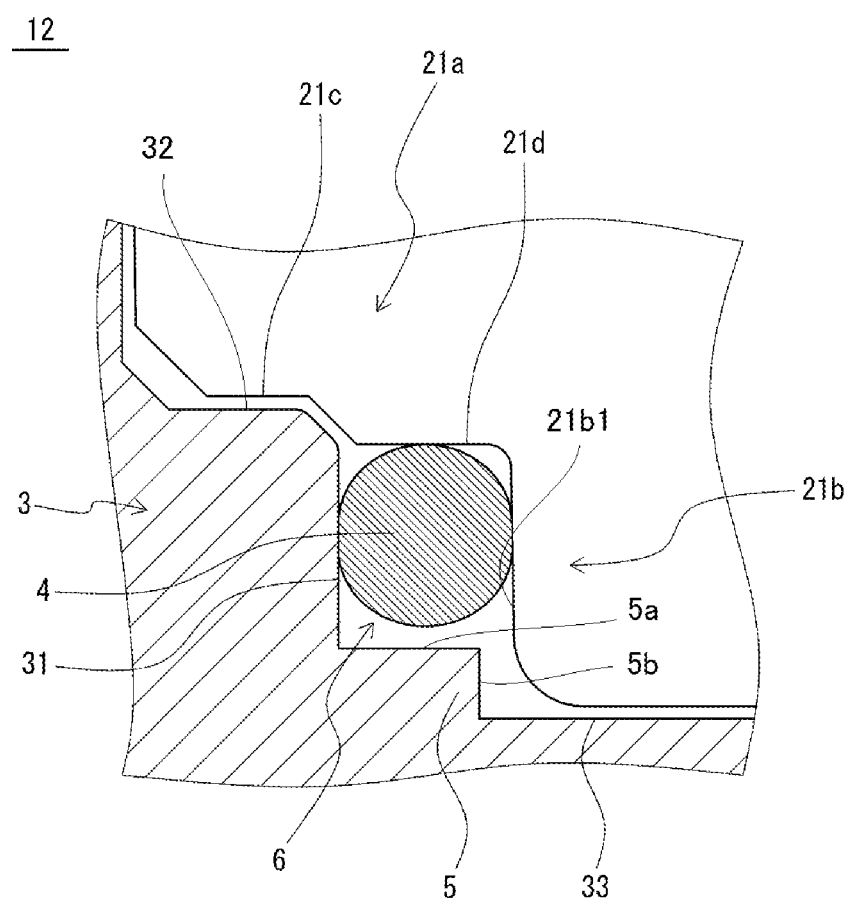
FIG. 5 is a partly enlarged view showing a sealing structure of a lens unit 12.
Figure 6:
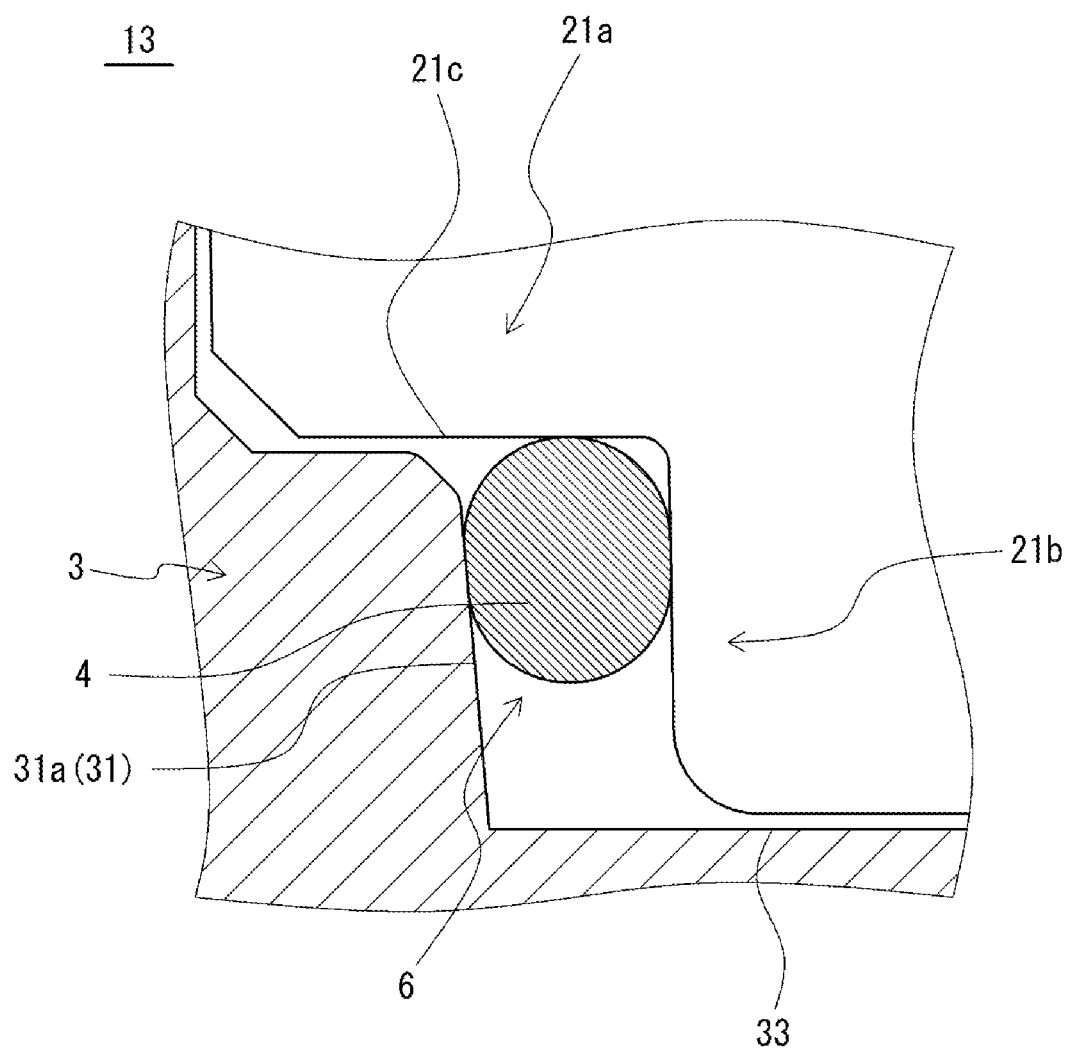
FIG. 6 is a partly enlarged view showing a sealing structure of a lens unit 13.
Figure 7A:
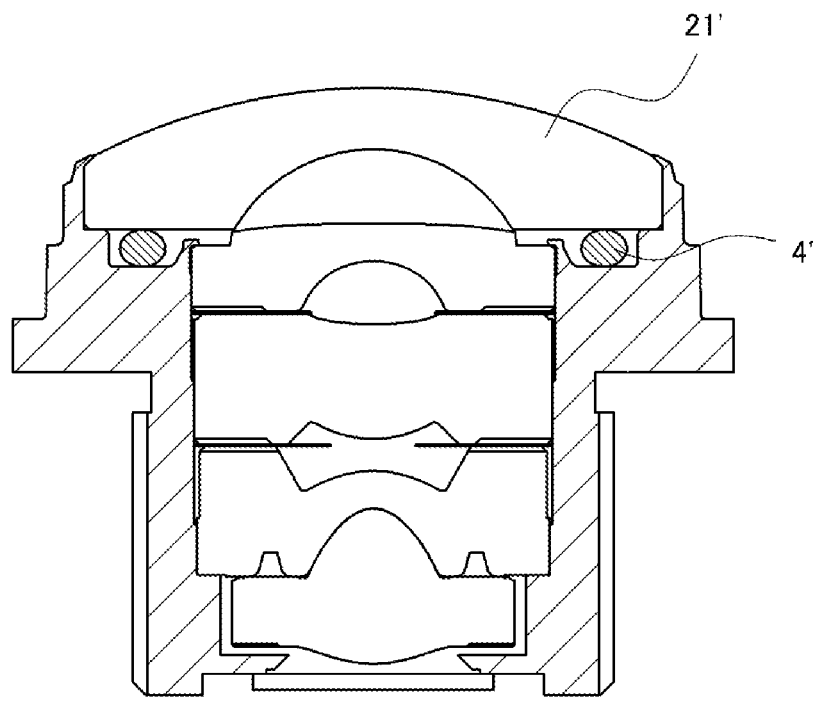
FIG. 7A is an explanatory view showing an attaching structure of an O-ring in a lens unit whose first lens is a glass lens and FIG. 7B is an explanatory view showing an attaching structure of an O-ring in a lens unit whose first lens is a plastic lens.
Figure 7B:
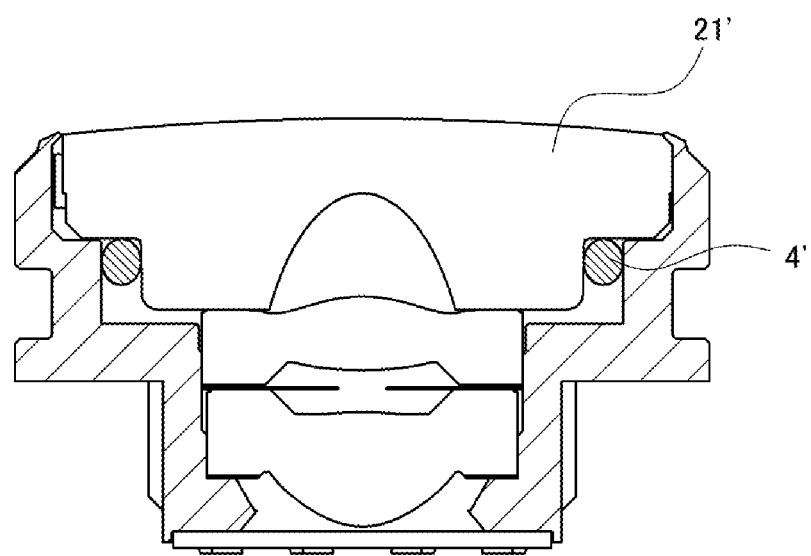

FIGS. 4, 5 and 6 are partly enlarged views showing a sealing structure (corresponding to the portion of the lens unit 1 which is surrounded by the dotted line "A" in FIG. 1) in accordance with other embodiments of the present invention. Basic structures of these embodiments are similar to the embodiment described above and thus the same reference signs are used in common portions and their detailed descriptions are omitted.

In the lens unit 11 shown in FIG. 4, in addition to the structure in FIG. 2, an outer peripheral face of the small diameter part 21b of the first lens 21 is formed in an inclined face 21b2 whose outer diameter becomes smaller toward the image side. An inclination angle ($\theta$) of the inclined face is adjusted to be $1° \leq \theta \leq 3°$ with respect to the optical axis direction. In this case, the flat face 5a extended in the radial direction toward the inclined face 21b2 which is an outer peripheral face of the small diameter part 21b of the first lens 21 is provided with a radial direction width which is equal to or wider than a half of a radial direction distance between the inclined face 21b2 of the small diameter part 21b and the opposed face 31 of the lens holder 3 at a position where the flat face 5a is formed. Further, the inner side face 5b is formed to a position facing the outer peripheral face (the inclined face 21b2) of the small diameter part 21b, in other words, to a position surrounding the inclined face 21b2 of the small diameter part 21b.

Since the outer peripheral face of the small diameter part 21b is formed in the inclined face 21b2 whose outer diameter becomes smaller toward the image side, assembling of the first lens 21 to the lens holder 3 becomes easy. Further, since a force directing to the image side is easily and intentionally generated to the O-ring 4, the O-ring 4 is hard to be caught and bitten between the object side end part of the opposed face 31 and the step face 21c. Also in this case, coming-off of the O-ring 4 is prevented by the protruded part 5 and thus both of easiness of assembling and stability of waterproof performance are attained. Further, releasability (separation from a die) of the lens holder 3 from a die is also superior.

In the lens unit 12 shown in FIG. 5, the step face 21c is formed with a ring-shaped pushing part 21d which is protruded to an inside of the sealing member accommodation part 6. Therefore, when the first lens 21 is to be fitted into the lens holder 3, the pushing part 21d pushes first the O-ring 4 to an inside of the sealing member accommodation part 6 and thereby the O-ring 4 is prevented from being bitten between the object side end part of the opposed face 31 and the step face 21c.

In a lens unit 13 shown in FIG. 6, instead of the protruded part 5, an inclined face 31a is formed as the sealing member coming-off prevention part so that an opposed face 31 is projected to an inner side in a radial direction toward the image side. The inclined face 31a is formed in a ring shape over the entire periphery of the sealing member accommodation part 6 while avoiding the recessed parts 39 in the horizontal face 33 and similar effects to those of the protruded part 5 can be attained.

Although the present invention has been shown and described with reference to a specific embodiment, various changes and modifications will be apparent to those skilled in the art from the teachings herein.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens unit comprising:
   a plurality of lenses;
   a lens holder which holds the plurality of the lenses; and
   a circular ring-shaped sealing member made of rubber;
   wherein a first lens of the plurality of lenses is disposed closest to an object side and is a plastic lens, the first lens being formed with a small diameter part and a large diameter part, the small diameter part having an outer diameter set to be smaller than the large diameter part and in a step shape on an image side of the first lens;
   wherein a sealing member accommodation part, which is a space in which the sealing member is disposed, is provided between an outer peripheral face of the small diameter part and an opposed face which is an inner peripheral face of the lens holder that faces the outer peripheral face of the small diameter part;
   wherein the sealing member accommodation part accommodates the sealing member so as to have clearance in an optical axis direction; and
   an inner face of the lens holder for defining the sealing member accommodation part is formed with a sealing member coming-off prevention part which is projected to the sealing member accommodation part to narrow the clearance on the image side of the sealing member accommodation part and thereby movement to the image side of the sealing member is restricted;
   an end face on the image side of the sealing member accommodation part is formed of an image side end face which is extended to an inner side in a radial direction from an inner side face of the sealing member coming-off prevention part; and
   wherein the sealing member coming-off prevention part is a protruded part which is formed so that a part including a face perpendicular to the image side end face is protruded to an inside of the sealing member accommodation part.

2. The lens unit according to claim 1, wherein the sealing member is an O-ring.

3. The lens unit according to claim 1, wherein the protruded part is formed at an outer circumference of a bottom portion of the sealing member accommodation part.

4. The lens unit according to claim 1, wherein
   the protruded part is, when viewed as a cross section in the optical axis direction, a step part which is formed of a flat face which is extended in the radial direction toward an outer peripheral face of the small diameter part of the first lens and an inner side face which is extended from the image side end face in the optical axis direction,
   the flat face is provided with a radial direction width which is equal to or wider than a half of a radial direction distance between the outer peripheral face of the small diameter part and the opposed face of the lens holder, and
   the inner side face extended in the optical axis direction of the step part is formed to a position facing the outer peripheral face of the small diameter part in the radial direction.

5. The lens unit according to claim 4, wherein a length in the optical axis direction of the sealing member accommodation part is set to be smaller than a length in the optical axis direction of the small diameter part of the first lens by the flat face of the step part.

6. The lens unit according to claim 5, wherein the sealing member is an O-ring.

7. The lens unit according to claim 1, wherein the outer peripheral face of the small diameter part is formed in an inclined face whose outer diameter becomes smaller toward the image side.

8. The lens unit according to claim 7, wherein an inclination angle (θ) with respect to the optical axis direction of the inclined face is set as follows:

$1° \leq \theta \leq 3°$.

9. The lens unit according to claim 8, wherein the protruded part is formed at an outer circumference of a bottom portion of the sealing member accommodation part.

10. The lens unit according to claim 8, wherein
    the protruded part is, when viewed as a cross section in the optical axis direction, a step part which is formed of a flat face which is extended in the radial direction toward an outer peripheral face of the small diameter part of the first lens and an inner side face which is extended from the image side end face in the optical axis direction,
    the flat face is provided with a radial direction width which is equal to or wider than a half of a radial direction distance between the outer peripheral face of the small diameter part and the opposed face of the lens holder, and
    the inner side face extended in the optical axis direction of the step part is formed to a position facing the outer peripheral face of the small diameter part in the radial direction.

11. The lens unit according to claim 1, wherein
    an inner diameter of the opposed face is smaller than an outer diameter of a large diameter part of the first lens which is a portion to the object side of the small diameter part,
    an end face of the first lens on the object side of the sealing member accommodation part is a step face of the first lens which is formed by connecting an outer peripheral face of the large diameter part of the first lens with the outer peripheral face of the small diameter part, the step face being extended in a radial direction, and
    an object side end part of the opposed face facing the step face is formed in a chamfered shape or a rounded shape.

12. The lens unit according to claim 11, wherein the step face is formed with a pushing part which is protruded in an inside of the sealing member accommodation part.

13. The lens unit according to claim 11, wherein
    the lens holder is formed with a large diameter flat face which faces the step face of the first lens and is connected with the opposed face,
    a chamfered face which is formed in the chamfered shape or the rounded shape is formed between an inner side edge part of the large diameter flat face and an object side edge part of the opposed face, and an outermost position of the chamfered face connected with the large diameter flat face is located at a position on an outer side with respect to an outer peripheral face of the sealing member in a state that the sealing member is attached to the small diameter part of the first lens but the sealing member is not compressed by the opposed face.

14. The lens unit according to claim 1, wherein occupation rate of the sealing member in the sealing member accommodation part is 85%-90%.

* * * * *